US010037692B2

(12) United States Patent
Moritani et al.

(10) Patent No.: US 10,037,692 B2
(45) Date of Patent: Jul. 31, 2018

(54) TRAFFIC SIGN RECOGNITION SYSTEM

(71) Applicant: Mazda Motor Corporation, Aki-gun, Hiroshima (JP)

(72) Inventors: Takayuki Moritani, Hiroshima (JP); Yasutaka Otsubo, Aki-gun (JP); Tsuyoshi Arinaga, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/354,065

(22) Filed: Nov. 17, 2016

(65) Prior Publication Data

US 2017/0154523 A1 Jun. 1, 2017

(30) Foreign Application Priority Data

Nov. 26, 2015 (JP) .................. 2015-230222

(51) Int. Cl.
*G08G 1/095* (2006.01)
*G08G 1/07* (2006.01)
*G08B 21/06* (2006.01)
*G08G 1/09* (2006.01)
*G06K 9/00* (2006.01)
*G08G 1/0962* (2006.01)

(52) U.S. Cl.
CPC .......... *G08G 1/07* (2013.01); *G06K 9/00818* (2013.01); *G08B 21/06* (2013.01); *G08G 1/09* (2013.01); *G08G 1/09623* (2013.01)

(58) Field of Classification Search
CPC ................................ G06K 9/00818
See application file for complete search history.

(56) References Cited

U.S. PATENT DOCUMENTS

| 2012/0154591 | A1* | 6/2012 | Baur ........................ B60R 1/00 348/148 |
| 2014/0200759 | A1* | 7/2014 | Lu .......................... B60D 1/245 701/28 |
| 2016/0180182 | A1* | 6/2016 | Gupta ................ G06K 9/00805 348/148 |
| 2017/0096144 | A1* | 4/2017 | Elie ...................... B60W 10/18 |

FOREIGN PATENT DOCUMENTS

| JP | 2014-120111 A | * | 6/2014 | .............. G08G 1/16 |
| JP | 2014120111 A | | 6/2014 | |

* cited by examiner

*Primary Examiner* — Pameshanand Mahase
(74) *Attorney, Agent, or Firm* — Alleman Hall Creaseman & Tuttle LLP

(57) ABSTRACT

A traffic sign recognition system includes a display for displaying caution information regarding a traffic sign ahead of a vehicle, and a processor configured to execute a viewing direction detecting module for detecting a viewing direction of a driver, a traffic sign detecting module for detecting the traffic sign, and a road surface condition detecting module for detecting a slippery road surface condition. The processor controls the display to display the caution information regarding the detected traffic sign when the detected viewing direction of the driver is different from a direction of the detected traffic sign, and controlling the display to refrain from displaying the caution information when the detected viewing direction of the driver matches the direction of the detected traffic sign. When the slippery road surface condition is detected, the processor controls the display to display the caution information regardless of the viewing direction of the driver.

7 Claims, 4 Drawing Sheets

TRAFFIC SIGN RECOGNITION SYSTEM

BACKGROUND

The present invention relates to a traffic sign recognition system.

For safe driving etc., it is undesirable to be unaware of a traffic sign installed on a road. JP2014-120111A discloses an art in which a detector for detecting a line of sight of a driver driving a vehicle is provided and if a viewing direction (line of sight) of the driver is different from a direction of a traffic sign ahead of the vehicle, it is considered that the traffic sign is not viewed by the driver and caution information is displayed.

Among a variety of types of traffic signs, there are warning signs mainly illustrated in yellow. Some of various kinds of warning signs which indicate road situations ahead of vehicles indicate a slippery road condition, existence of a sharp curve, a road intersection or branching, a narrowing road width (e.g., merging of lanes), road under construction, a high possibility of rocks falling, etc.

With the art described in JP2014-120111A, when the viewing direction of the driver is toward the traffic sign, the traffic sign is considered as viewed and caution information regarding the traffic sign is not displayed. However, even if the viewing direction of the driver is toward the traffic sign, it does not mean that the driver sufficiently understands the contents of the traffic sign. If the contents of the traffic sign are for bringing high attention to a road condition ahead of the vehicle, it is desirable to lower a vehicle speed or refrain from sharp acceleration. Especially if a road surface condition is slippery, since a behavior of the vehicle may become unstable due to acceleration or change in steering, it is desirable to enhance the understanding of the traffic sign by the driver.

SUMMARY

The present invention is made in view of the above issues and aims to provide a traffic sign recognition system, which is capable of enhancing the understanding of a traffic sign by a driver when a slippery road condition.

According to one aspect of the present invention, a traffic sign recognition system is provided. The system includes a display unit for displaying, for a driver of a vehicle, caution information regarding a traffic sign ahead of the vehicle, and a processor configured to execute a viewing direction detecting module for detecting a viewing direction of the driver, a traffic sign detecting module for detecting the traffic sign, and a road surface condition detecting module for detecting a slippery road surface condition. The processor is configured to control the display unit to display the caution information regarding the detected traffic sign when the detected viewing direction of the driver is different from a direction of the detected traffic sign, and controls the display unit to refrain from displaying the caution information when the detected viewing direction of the driver matches the direction of the detected traffic sign. When the slippery road surface condition is detected, the processor controls the display unit to display the caution information regardless of the viewing direction of the driver.

According to the above configuration, when the line of sight of the driver (the viewing direction) is not oriented toward the detected traffic sign, the caution information regarding the traffic sign is displayed to bring it to the attention of the driver. Whereas, when the line of sight is oriented toward the traffic sign, it is considered that the traffic sign is viewed by the driver and the caution information is not displayed unnecessarily. Additionally, when the slippery road surface condition is detected, since the vehicle easily becomes unstable due to steering operation, acceleration, deceleration, etc., the caution information regarding the traffic sign is displayed even when the line of sight is oriented toward the traffic sign. Thus, the attention of the driver can be raised more reliably.

The traffic sign of which the caution information is displayed regardless of the viewing direction of the driver may be a warning sign. Thus, the attention of the driver to the information regarding the traffic sign of which the driver should be cautious can be raised more reliably.

The warning sign may indicate a road condition ahead of the vehicle. When the road condition ahead of the vehicle requires an attention and also the road surface is slippery, an even higher attention is desired. In such a state, it is extremely preferable in firmly reminding the driver to drive carefully by reliably bringing it to the attention of the driver.

The warning sign may indicate at least one of a slippery road surface, existence of a curve, a road intersection, a narrowing road width, caution for falling rocks, and road under construction. Thus, the attention of the driver to the information regarding traffic signs indicating a condition which requires a high attention to travel can be raised more reliably.

The road surface condition detecting module may detect the slippery road surface condition when an outdoor air temperature detected by an outdoor air temperature sensor is below a given temperature. Thus, the slippery road surface condition can easily be detected based on the outdoor air temperature.

The road surface condition detecting module may detect the slippery road surface condition when a road surface µ detected by a road surface µ sensor is below a given value. Thus, the slippery road surface condition can be detected reliably based on the road surface µ.

The road surface condition detecting module may detect the slippery road surface condition when a rainy weather is detected by a rain detector. Here, a wiper provided to the vehicle can be utilized to easily detect the slippery road surface condition.

DETAILED DESCRIPTION OF EMBODIMENT

Figure 1:
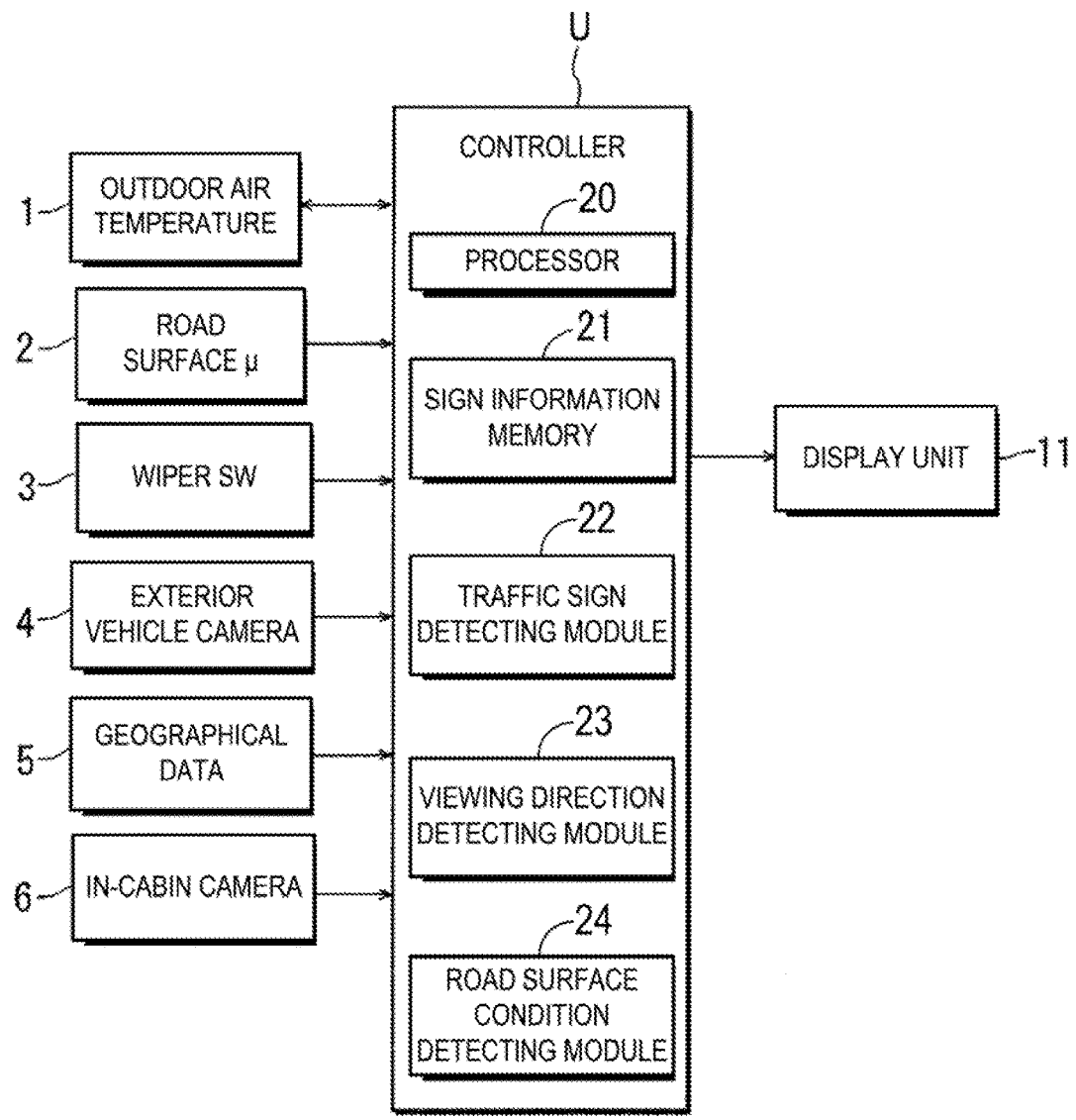
FIG. 1 is a block diagram illustrating an example of a control system according to the present invention.

In FIG. 1, the reference character "U" is a controller (control unit) configured by using a microcomputer, including a processor 20. The controller U receives signals from various sensors or devices 1 to 6. Specifically, the reference character "1" is a temperature sensor for detecting an outdoor air temperature. The reference character "2" is a µ-sensor for detecting a road surface friction coefficient µ (referred to herein simply as "road surface µ"). Note that the road surface µ may be detected by a suitable conventionally known method, such as a calculation based on a vehicle wheel rotational speed. The reference character "3" is a wiper switch (for rain and snow detection). The reference character "4" is an exterior vehicle camera for imaging a view forward of a vehicle concerned (hereinafter, simply referred to as "the vehicle"), and it detects existence of a traffic sign ahead of the vehicle (including traffic lights installed at an intersection), especially a warning sign indicating a road condition ahead of the vehicle. The reference character "5" is a geographical data acquiring system (navigation system) for procuring information regarding the existence of traffic signs and a road condition ahead of the vehicle. The reference character "6" is an in-cabin camera for detecting a line of sight of the driver of the vehicle in order to detect whether the traffic sign ahead of the vehicle is viewed.

The controller U controls a display unit 11 via a processor 20 of the controller U. The display unit 11 displays caution information regarding the traffic sign. This display unit 11 may be configured by a display provided in front of a steering wheel, a head-up display, and/or a display for navigation system. The controller U includes a sign information memory 21 for storing image data of various traffic signs and meanings thereof in association with each other (creating a database).

Figure 2:
FIG. 2 is a view illustrating an example of a warning sign indicating a road condition ahead.
Figure 3:
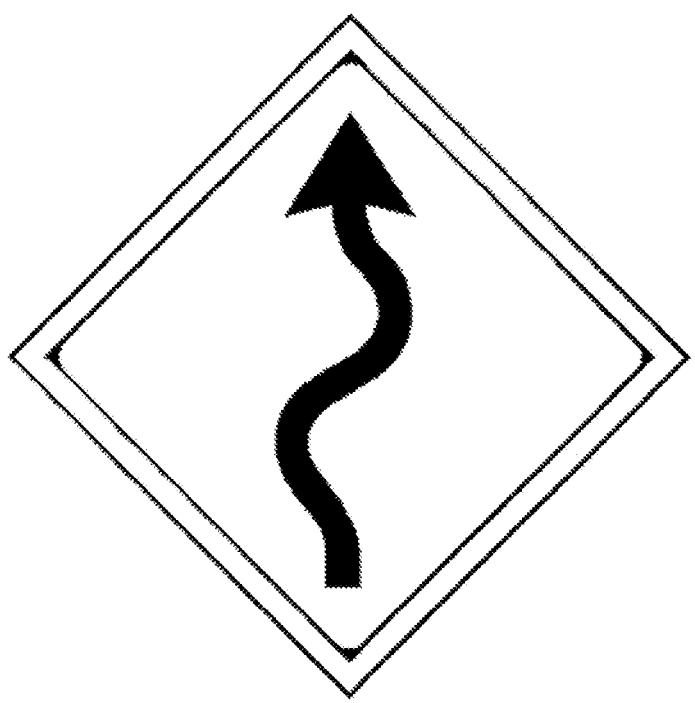
FIG. 3 is a view illustrating another example of a warning sign indicating a road condition ahead.

FIGS. 2 and 3 are views illustrating examples of the warning sign as the traffic sign, respectively indicating a road condition ahead. Specifically, the warning sign of FIG. 2 indicates a slippery road condition ahead, and the warning sign of FIG. 3 indicates a curvy road ahead.

Figure 4:
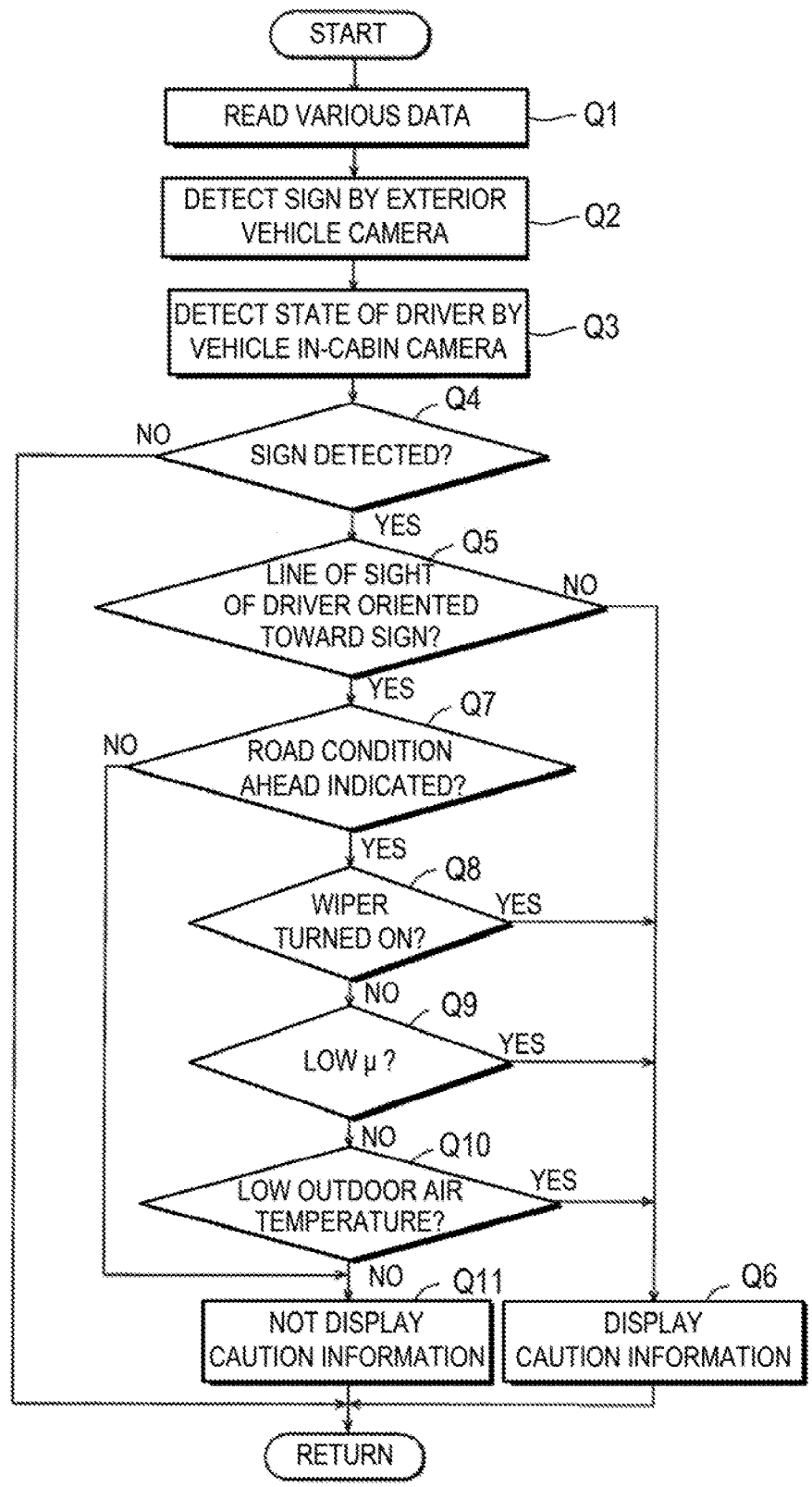
FIG. 4 is a flowchart illustrating an example of a control according to the present invention.

Next, an example of the control according to the present invention is described with reference to FIG. 4. Note that in the following description, "Q" indicates each process. First in Q1, the signals from the various sensors or the devices 1 to 6 are received. In Q2, the traffic sign stored in the sign information memory 21 is detected from view(s) imaged by the exterior vehicle camera 4 (meaning of the detected traffic sign is determined and the caution information corresponding thereto is extracted), and also a direction of the detected traffic sign (a direction toward the location thereof) is determined. Then in Q3, the in-cabin camera 6 detects the line of sight of the driver.

Then in Q4, whether the traffic sign is detected is determined. If the determination result in Q4 is negative, the control returns to the start of the control. If the determination result in Q4 is positive, in Q5, whether the line of sight of the driver (the direction detected by the in-cabin camera 6) is oriented toward the detected traffic sign (the direction detected by the exterior vehicle camera 4) is determined. If the determination result of Q5 is negative, in Q6, the display unit 11 displays the caution information regarding the detected traffic sign.

In Q6, if the detected traffic sign is the same as the sign illustrated in FIG. 2, the display contents of the caution information is, for example, letters "Caution. Slippery road ahead." Further if the detected traffic sign is the same as the sign illustrated in FIG. 3, the display contents of the caution information are, for example, letters "Caution. Curvy road ahead." Note that caution information which is displayed corresponding to traffic signs is stored in the sign information memory 21 of the controller U, in association with the individual traffic signs.

If the determination result in Q5 is positive, in Q7, whether the detected traffic sign is a warning sign indicating a road condition ahead of the vehicle, such as one of the signs illustrated in FIGS. 2 and 3, is determined. If the determination result in Q7 is negative, the control proceeds to Q11 where the caution information regarding the detected traffic sign is not displayed on the display unit 11.

If the determination result of Q7 is positive, the caution information regarding the traffic sign may be assumed to be not displayed on the display unit 11. However, in the slippery road condition, the caution information is displayed on the display unit 11. Specifically, if the determination result of one of Q8 to Q10 is positive, the road condition is considered as slippery and the control proceeds to Q6.

In Q8, whether the wiper is turned on is determined and if the wiper is determined to be turned on, the control proceeds to Q6 (the caution information is displayed). Further in Q9, whether the road surface μ is low, which is below a given value, is determined. If the determination result of Q9 is positive (low μ), the control proceeds to Q6 (the caution information is displayed). Further in Q10, whether the outdoor air temperature is low, which is a given temperature (e.g., 2° C.) or below (whether a possibility of the road surface to freeze is high). If the determination result of Q10 is positive, the control proceeds to Q6 (the caution information is displayed).

If the determination result of Q10 is negative, the road surface is considered as not slippery, and in Q11, the caution information regarding the detected traffic sign is not displayed.

As described above, when the line of sight of the driver is oriented toward the detected traffic sign, the traffic sign is considered as viewed, the caution information regarding the detected traffic sign is not displayed. However, when the detected traffic sign indicates that the road condition ahead of the vehicle requires a high attention and also the road surface is slippery, for more reliable ensured safety, the caution information regarding the detected traffic sign is displayed on the display unit 11. This will raise an attention in case the driver views the detected traffic sign but does not sufficiently understands the meaning of the traffic sign, and it is extremely preferable in ensuring safety. Obviously if the road surface is not slippery (e.g., dry paved road), the caution information is not displayed as long as the viewing direction of the driver is toward the traffic sign, which is preferable in avoiding annoying the driver by frequently displaying the caution information.

Although the embodiment is described above, the present invention is not limited to this, and may suitably be modified within the scope of the claims. The slippery road surface condition may be detected by a suitable conventionally known method, other than the method described in this embodiment. The warning sign indicating a road condition ahead of the vehicle includes, in addition to the sign described in this embodiment, various other kinds of signs, for example, a sign indicating a curving direction of the road (including rightward and leftward turning directions), a sign indicating a narrowing road width (including merging of lanes), a sign indicating that the road is under construction, a sign indicating a high possibility of rocks falling, a sign indicating existence of an intersection (e.g., three-way junction or four-way junction), a sign indicating existence of a railroad crossing, a sign indicating existence of a branch section of the road, and a sign indicating a possibility of a wild animal entering the road. The traffic sign indicating a road condition ahead of the vehicle (warning sign) may be detected based on geographical data. The direction of the traffic sign may be detected by using, other than the camera, a radar. Each one or a combination of two or more of the group of processes of the flowchart indicates a function of the controller U, and by adding "module" to the name/phrase indicating the function, it is possible to consider them as software components of the controller. For example, the controller U may comprise a specific traffic sign detecting module 22 executable by the processor 20 of the controller U to detect the specific traffic sign ahead of the vehicle via the exterior vehicle camera 4; a viewing direction detecting module 23 executable by the processor 20 to detect whether the specific traffic sign is viewed by the driver of the vehicle via the in-cabin camera 6; and a road surface condition detecting module 24 executable by the processor 20 to detect a road surface μ via the road surface μ-sensor 2. The purpose of the present invention is not limited to the explicitly described purpose, and also implicitly includes providing what is expressed as practically preferable or advantageous.

The present invention is preferable in safety securing by enhancing grasp of a traffic sign by a driver when a slippery road condition.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

U Controller
1 Sensor (For Outdoor Air Temperature Detection)
2 Sensor (For Road Surface μ Detection)
3 Wiper Switch (For Rain and Snow Detection)
4 Exterior Vehicle Camera (For Traffic Sign Detection)
5 Geographical Data Acquiring System (Navigation System)
6 In-cabin Camera (For Driver's Line of Sight Detection)
11 Display Unit
21 Sign Information Memory

What is claimed is:

1. A traffic sign recognition system, comprising:
a display unit for displaying, for a driver of a vehicle, caution information regarding a traffic sign ahead of the vehicle; and
a processor configured to execute:
a viewing direction detecting module for detecting a viewing direction of the driver;
a traffic sign detecting module for detecting the traffic sign;
a road surface condition detecting module for detecting a slippery road surface condition; wherein
the processor is configured to control the display unit to display the caution information regarding the detected traffic sign when the detected viewing direction of the driver is different from a direction of the detected traffic sign, and control the display unit to refrain from displaying the caution information when the detected viewing direction of the driver matches with the direction of the detected traffic sign,
wherein when the slippery road surface condition is detected, the processor controls the display unit to display the caution information even when the viewing direction of the driver matches with the direction of the detected traffic sign.

2. The system of claim 1, wherein the traffic sign of which the caution information is displayed regardless of the viewing direction of the driver is a warning sign.

3. The system of claim 2, wherein the warning sign indicates a road condition ahead of the vehicle.

4. The system of claim 3, wherein the warning sign indicates at least one of a slippery road surface, existence of a curve, a road intersection, a narrowing road width, caution for falling rocks, and road under construction.

5. The system of claim 1, wherein the road surface condition detecting module detects the slippery road surface condition when an outdoor air temperature detected by an outdoor air temperature detector is below a given temperature.

6. The system of claim 1, wherein the road surface condition detecting module detects the slippery road surface condition when a road surface μ detected by a road surface μ detector is below a given value.

7. The system of claim 1, wherein the road surface condition detecting module detects the slippery road surface condition when rainy weather is detected by a rain detector.

* * * * *